United States Patent [19]

Nakajima et al.

[11] Patent Number: 5,725,340
[45] Date of Patent: Mar. 10, 1998

[54] TIP DRESSER

[75] Inventors: Toshiharu Nakajima, Yokkaichi; Tadashi Goto, Mie-ken; Satoru Machimura, Suzuka; Shinji Hoshino, Suzuka; Hiroshi Ohtani, Suzuka, all of Japan

[73] Assignee: Honda Giken Kogyo Kabushiki Kaisha, Tokyo, Japan

[21] Appl. No.: 567,347

[22] Filed: Nov. 21, 1995

[30] Foreign Application Priority Data

Nov. 22, 1994 [JP] Japan .................. 6-287951

[51] Int. Cl.$^6$ .................................................. B23C 3/12
[52] U.S. Cl. ........................ 409/140; 409/228; 408/203.5; 407/42
[58] Field of Search ........................ 409/140, 138, 409/228, 139; 408/203.5, 211, 713; 407/42, 33, 54

[56] References Cited

U.S. PATENT DOCUMENTS

| | | | |
|---|---|---|---|
| 4,842,456 | 6/1989 | Saito | 409/140 X |
| 4,856,949 | 8/1989 | Shimada | 407/42 X |
| 4,966,506 | 10/1990 | Slanker | 407/33 X |
| 5,007,778 | 4/1991 | Hillestad et al. | 408/211 X |
| 5,332,342 | 7/1994 | Kizaki et al. | 409/140 |
| 5,445,481 | 8/1995 | Nakajima et al. | 409/140 |

FOREIGN PATENT DOCUMENTS 2626800   8/1989   France ................ 408/203.5

Primary Examiner—Daniel W. Howell
Assistant Examiner—Henry W. H. Tsai
Attorney, Agent, or Firm—Dickstein Shapiro Morin & Oshinsky LLP

[57] ABSTRACT

In order to prevent an electrode tip 8 from being burred during dressing process, thereby attaining high quality and stability of the electrode tip, a tip dresser features a screw-threaded circumference 5 formed around the rotatable cutter holder 1 for securing a one- or two-piece formed cutter element 2, for permitting the holder 1 to be rotated in one direction A manually or by a suitable driver. Frusto-conical recesses are symmetrically formed in both sides of the holder 1 for receiving the electrode tips, allowing the cutter element 2 to be mounted so as to slightly extend by a predetermined amount beyond the conically recessed surface. Another feature is in the form of apertures 6 and 7 provided through the holder 1 for discharging the cutting chips: one aperture 6 formed on the forward front side of the rotating direction of one machining edge 2a for the bevel surface of electrode tip 8, and another one 7 on the forward front side of rotating direction of another machining edge 2b for the end surface machining. The aperture 6 is formed along the edge 2a, and aperture 7 is formed so as to reach at least the boundary between the bottom and the conical side surface of each of the frusto-conical recesses.

8 Claims, 5 Drawing Sheets

TIP DRESSER

BACKGROUND OF THE INVENTION

1. Field of the Invention

The present invention relates to a tip dresser for reforming an electrode tip of a resistance welder.

2. Brief Description of the Prior Art

Conventionally, a tip dresser for refining electrode tips of a resistance welder has been proposed, in which a cutter is mounted on a holder, which is automatically or manually rotated in a predetermined direction. In such a tip dresser, the utmost tip end and a side bevel surface are machined by rotation of the holder mounted on the cutter element, and the chips produced by dressing process are discharged through an opening formed in the holder.

However, in the conventional tip dresser described above, since an aperture for discharging the dressing chips is formed generally along the cutter for machining the bevel surface, it is likely to cause formation of burrs if the discharging of chips is not performed by an appropriate timing, which can adversely affect on welding process and degrade the quality due to an excessive gnawing into the tips.

SUMMARY OF THE INVENTION

In view of the forgoing disadvantages, an object of the present invention is to provide a tip dresser capable of achieving an excellent welding result without incorporating formation of burrs, and providing electrode tips having high quality and stability.

Another object of the present invention is to provide a tip dresser comprising a cutter holder for securing a cutter element for machining the tip end as well as a bevel side surface, a rotating means for the cutter holder, a conical recess formed in the cutter holder for a cutter element mounted so as to slightly extend from the concave surface of the recess, and further, an aperture on the forward front side of the rotating direction of one machining edge being formed along the edge, and another aperture on the forward front side of the rotating direction of the other machining edge being formed so as to reach at least the boundary between the bottom and the conical side surface of each of frusto-conical recesses.

Another object of the invention is to provide a tip dresser, in which a tip end machining edge has a tapered region at a position not exceeding the center of the cutter holder or slightly beyond thereof.

A still further object of the present invention is to provide a tip dresser having a cutter element, the machining edge of which is chamfered.

As described above, an electrode tip is guided by the concave surface of a conical recess of the cutter holder to fit therein, and both the tip end and the bevel surface of the electrode tip are machined, and the cutting chips are readily discharged in an appropriate timing through an aperture or apertures formed so as to widely open toward the front side of the rotating direction of the cutter element.

DETAILED DESCRIPTION OF THE PREFERRED EMBODIMENTS

Figure 1A:
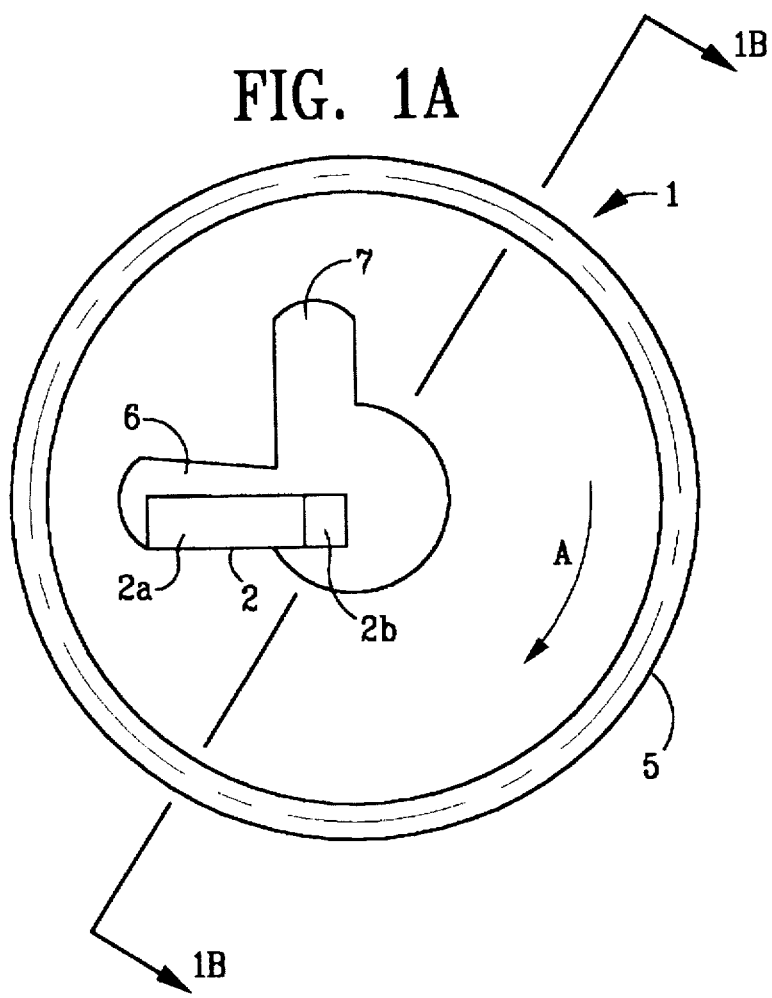
FIG. 1(a) is a plan view of a cutter holder of a tip dresser according to an embodiment of the invention.
Figure 1B:
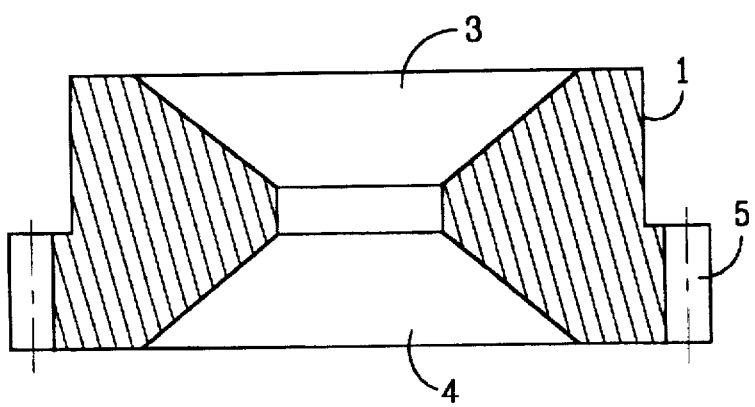
FIG. 1(b) is a cross-sectional view of the cutter holder of FIG. 1(a), taken along the line 1(b)—1(b), without the cutter element.

A cutter holder 1 holds therein a cutter element 2 for machining a tip end and a bevel side surface of an electrode tip, not shown in FIG. 1, and has frusto-conical recesses 3 and 4 formed symmetrically on the upper and lower sides thereof. The cutter element 2 is mounted so as to extend by a predetermined amount from each of the recessed surfaces. A threaded circumference 5 is provided so as to rotate the cutter holder 1 in one direction A of rotation driven by means of a motor or the like.

Figure 3A:
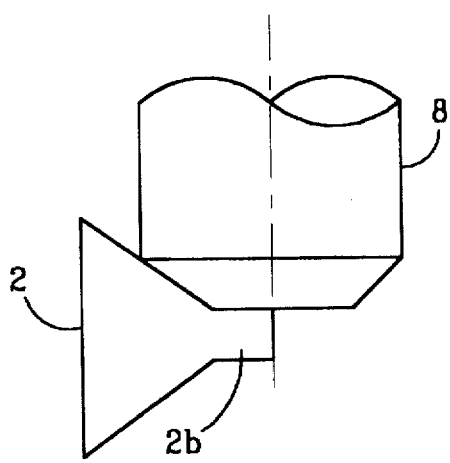
FIG. 3(a) and FIG. 3(b), each is a front view illustrating the engagement of a cutter element with an electrode tip.
Figure 3B:
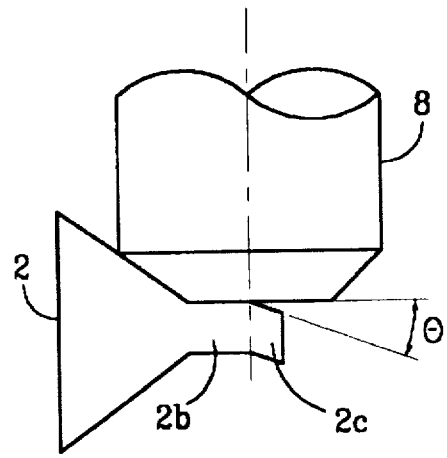

Cutter element 2 includes an edge 2a for machining a bevel surface and another edge 2b for machining a tip end of an electrode tip 8, which will be afterwardly illustrated in FIG. 3(a). In a side of the rotating direction of the machining edge 2a, an aperture 6 for discharging cutting chips along the edge 2a is formed; and moreover, another aperture 7 is formed in the side of the rotating direction of the machining edge 2b, which aperture 7 is formed so as to reach at least the intersection of the bottom and the recessed surface.

Figure 2A:
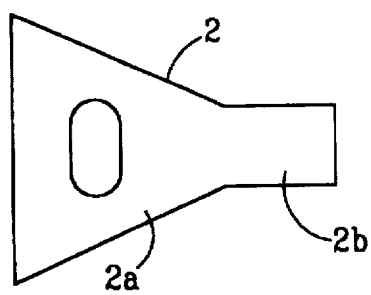
FIG. 2(a) and FIG. 2(b), each is a plan view of a cutter element.
Figure 2B:
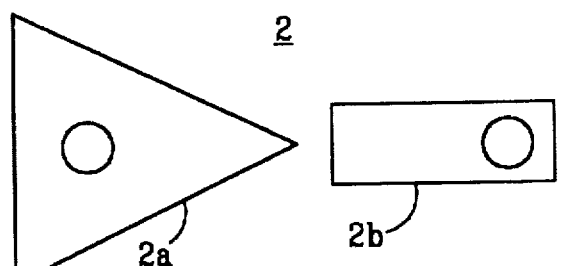

FIG. 2 depicts a cutter element 2. FIG. 2(a) shows an integrally formed cutter element 2 including a machining edge 2a and another machining edge 2b to form a one piece cutter, which is formed so that the amount of the edge extension is precisely controlled. The amount of such an extension is in practice not greater than 1 mm, more precisely in the range from 0.5 to 0.4 mm, which may be managed in the amount less than such a range depending on kinds of materials. FIG. 2(b) shows a two-piece type, each piece 2a and 2b thereof is separately secured to the holder, the amount of their extension being in the same manner adjusted within a predetermined value.

When the cutter 2 engages the tip 8 as shown in FIG. 3(a), it is necessary the edge 2b would not extend beyond the center of cutter holder 1, or be slightly inclined, escaped from the tip end of the electrode tip 8. The escapement angle theta may be 0.5 degree or so, and preferably in the range of 0.3 to 0.7 degree of angle.

Figure 4:
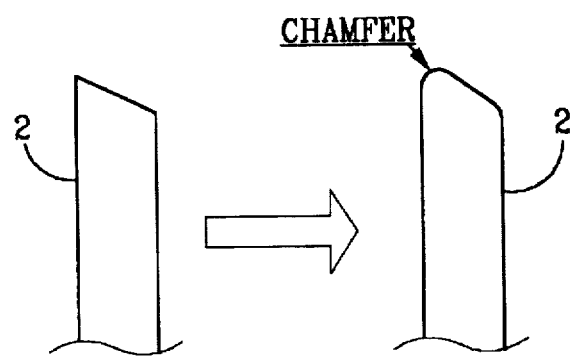
FIG. 4 is an explanatory view showing the chamfering process of a cutter element.

As shown in FIG. 4, the end of cutter 2 is chamfered to prevent gnawing into the electrode tip 8.

The cutter holder 1 is installed in a housing, not shown, and driven by a motor or the like for rotation in one direction driven through the threaded region 5. The electrode tip 8, urged by a predetermined pressure against the tip dresser having the cutter holder 1, is guided by the frusto-conical surface to an appropriate location, having the tip end and the bevel surface machined by the cutter 2 while rotated.

Since the electrode tip 8 is of a soft metal, such as copper, into which the edge of cutter 2 is likely to gnaw, it is likely to produce burrs at machining. However, the amount of extension can be precisely managed, further the tip end of cutter 2 is provided with chamfering, hence the production of burrs is minimized. Therefore, degradation of the welded region is prevented to achieve an excellent welding result, and at the same time an electrode tip 8 is obtained with high quality and stability.

The remaining cutting chips over the cutter holder can cause production of burrs to prevent the proper dressing of electrode tip 8, which can be suspended in that the chips are readily discharged through the apertures 6 and 7 with a proper timing, since the apertures are formed on the front side of rotating direction of each of edges 2a and 2b. Further, the cutter element 2 is of the structure by which the machining edge 2b is positioned as shifted from the central position of cutter holder 1, thereby preventing leaving of the unmachined core portion or pealing of electrode tip 8, and thus suppressing production of burrs, for achieving an excellent dressing of electrode tip 8.

Figure 5:
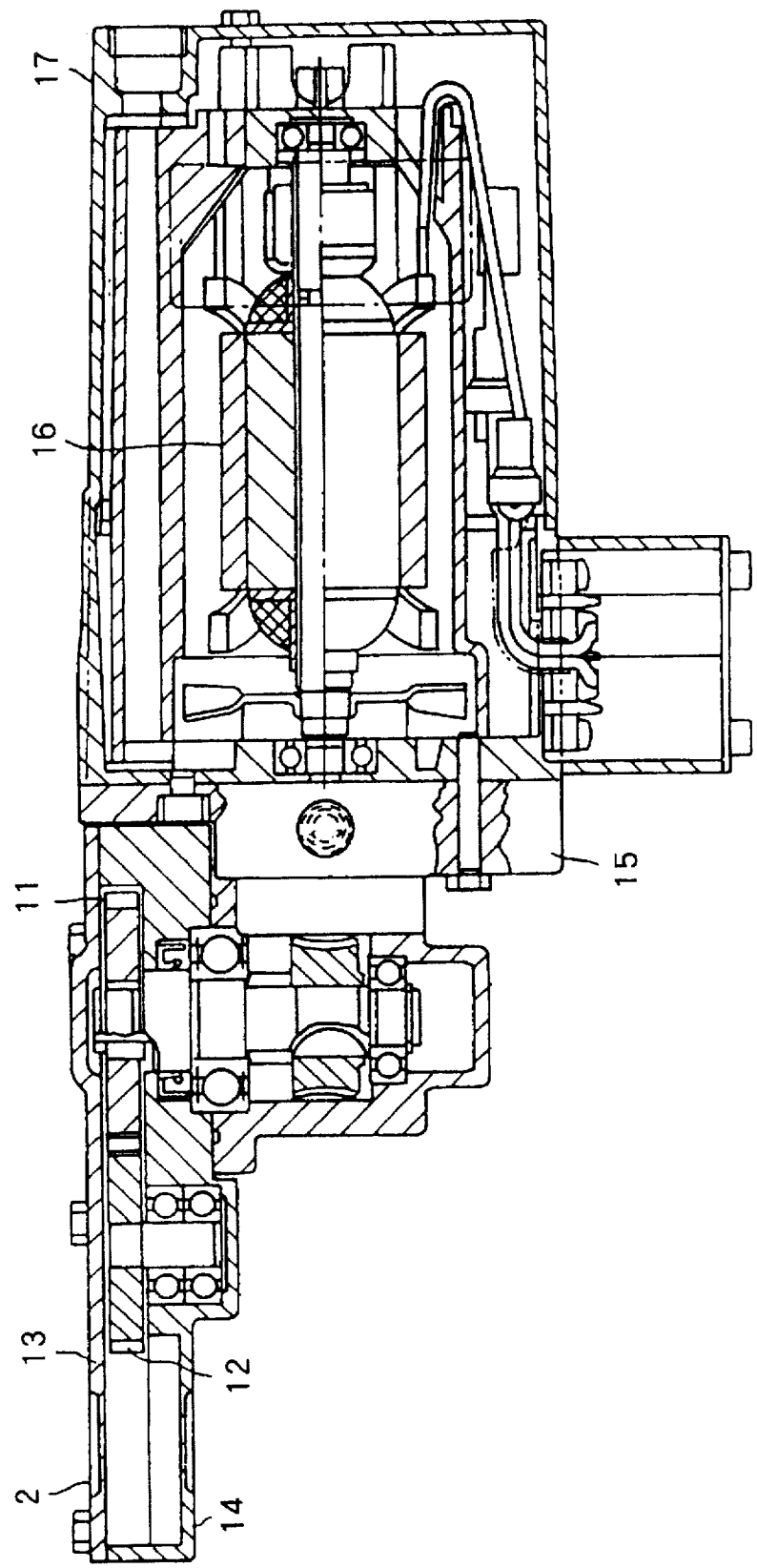
FIG. 5 is a schematic illustration of a pressure control assembly.

As shown by the side sectional view of the tip dresser in FIG. 5, the cutter holder 1 is formed integrally with a housing 14 having a cap 13 and enclosing power transferring gears 11 and 12, a shaft hole of the gear 11 engages with a rod having a key, and the driving power is transferred through a screw gear. In addition, housing 14 is permitted to be mounted on a base plate in an arbitrary direction, and the mounting angle for cutter holder 1 is freely selected. Within the base plate is enclosed a worm gear (screw gear), by means of which the screw gear is allowed to be rotated.

Enclosed inside the base plate are gears for rotating the worm gear, and these members are covered by a cover 15. Another cover 16 enclosing a rotor and a stator as structural members of the driving motor is covered with a cover housing 17, and provides a rotating power for cutter holder 2 via the aforementioned gears.

Figure 6:
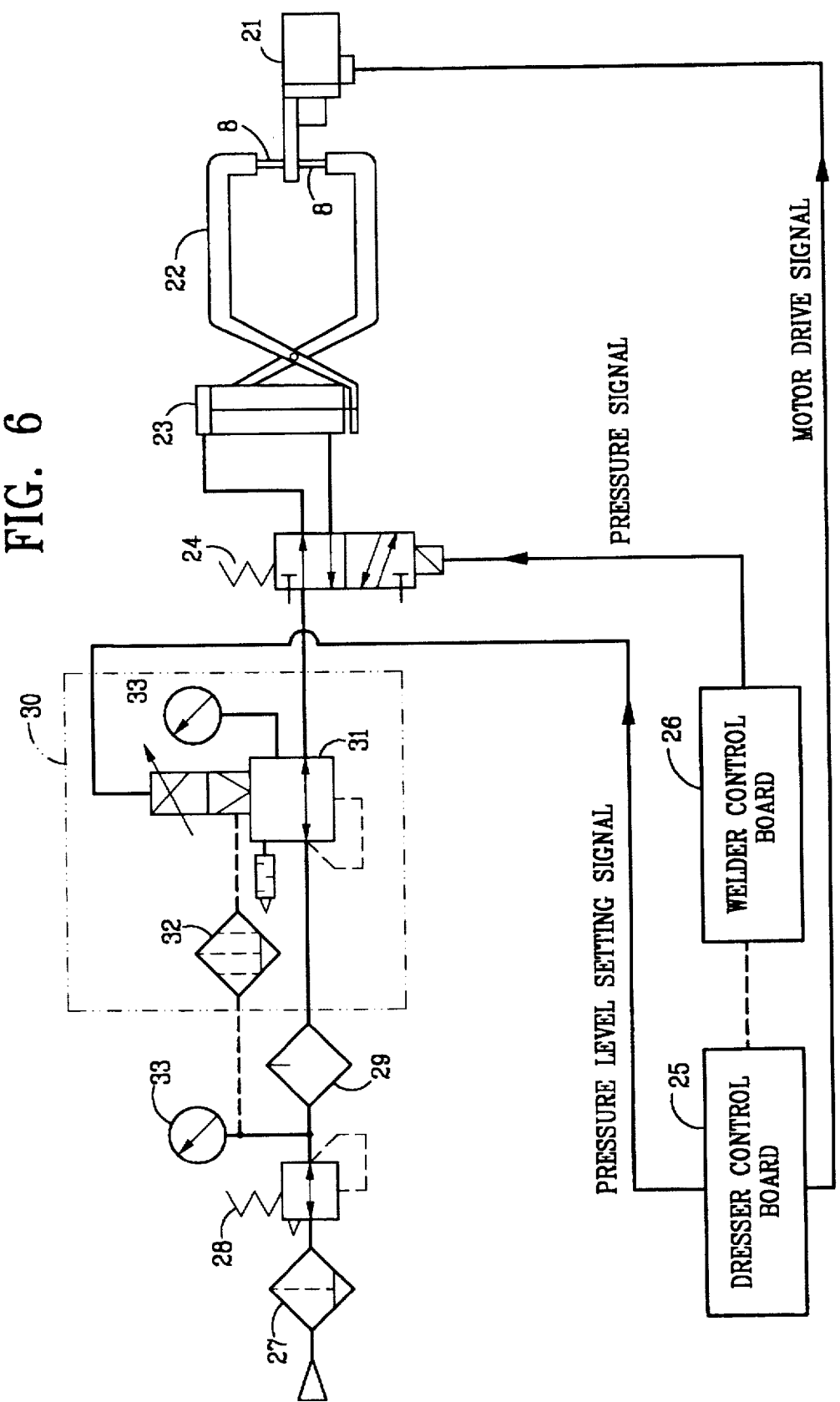
FIG. 6 is a diagrammatic illustration of the pressure control assembly for the electrode tip.
Figure 7:
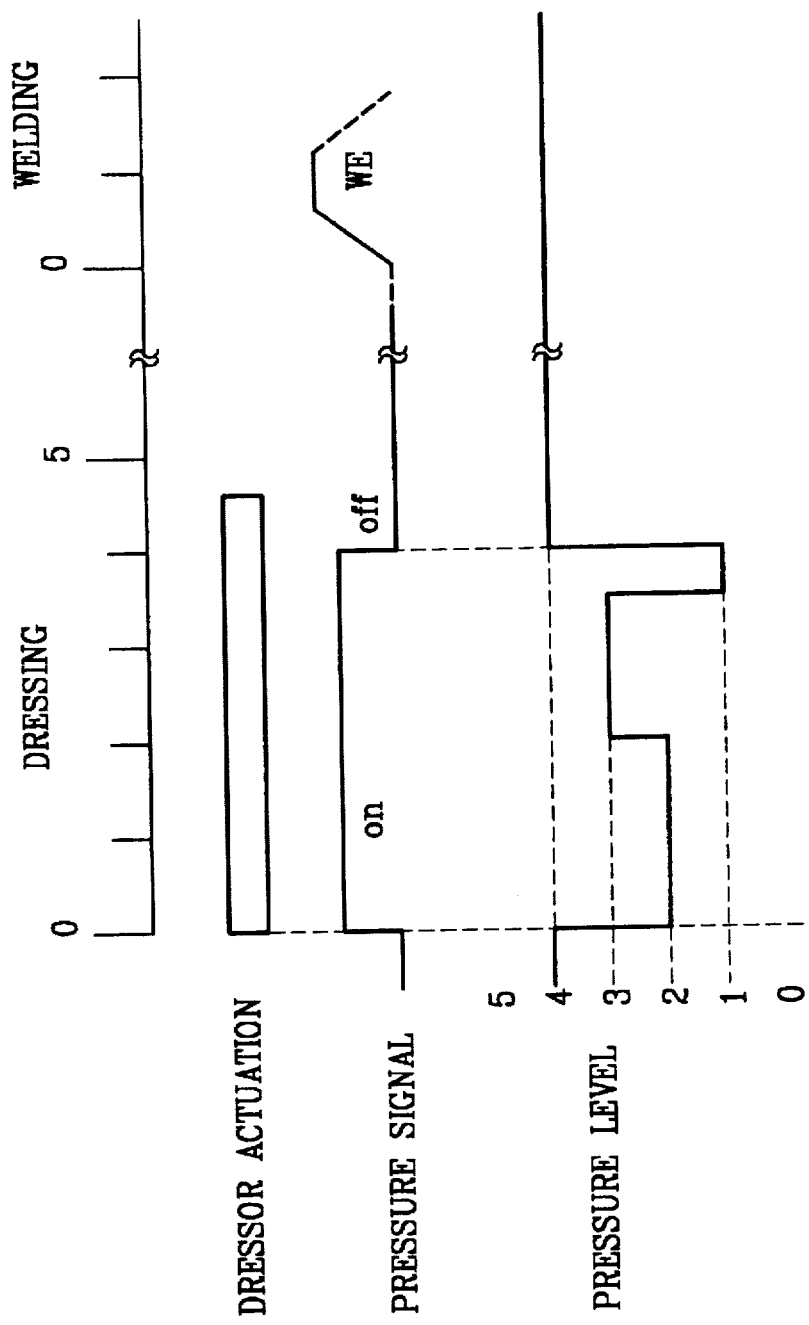
FIG. 7 is a timing chart of the cutting process of the electrode tip.

FIG. 6 illustrates the pressure control assembly for an electrode tip 8, together with a tip dresser 21, and a welding gun 22 to which the electrode tip 8 is mounted.

The pressure to be applied on the welding gun 22 is controlled by regulating an air cylinder 23 through a solenoid valve 24 interposed in an air passage, the solenoid valve 24 is applied with a pressure signal at dressing operation based on a pressure level setting signal supplied from a dresser control board 25 and another pressure signal supplied from a welder control board 26, and accordingly the pressure as well as the time duration of the pressure being applied are simultaneously controlled.

What is claimed is:

1. A tip dresser for reforming an electrode tip of a resistance welder comprising:

a cutter holder for securing a cutter element, said cutter element having a first machining edge for machining a tip end of said electrode tip, and a second machining edge for machining a bevel side surface of said electrode tip;

means for rotating said cutter holder;

said cutter holder is formed with frusto-conical concave recesses formed inwardly from the opposite ends thereof;

said cutter element is mounted to said cutter holder such that said machining edges slightly extend over said concave recesses; and said holder is formed therein with:

a first aperture for discharging cutting chips, said first aperture being formed along said second machining edge, and said first aperture being formed on a forward front side of said second machining edge in a rotating direction of said cutter element; and a second aperture for discharging cutting chips, said second aperture being formed on a forward front side of said first machining edge in a rotating direction of said cutter element.

2. A tip dresser according to claim 1, wherein said cutter holder has a pair of symmetrically formed, opposed frusto-conical recesses for receiving each of said electrode tips.

3. A tip dresser according to claim 2, wherein said cutter element for machining both said tip end and said bevel surface is integrally formed.

4. A tip dresser according to claim 3, wherein said cutter element has its machining edge chamfered.

5. A tip dresser according to claim 1, wherein said cutter element for machining both said tip end and said bevel surface is integrally formed.

6. A tip dresser according to claim 2, wherein said cutter element has its machining edge chamfered.

7. A tip dresser according to claim 3, wherein said cutter element has its machining edge chamfered.

8. A tip dresser according to claim 1, wherein said cutter element has its machining edge chamfered.

* * * * *